Sept. 23, 1969   P. J. GILLESPIE   3,468,712
ELECTRO-CHEMICAL CELL ARRANGEMENTS
Filed May 16, 1966   8 Sheets-Sheet 7

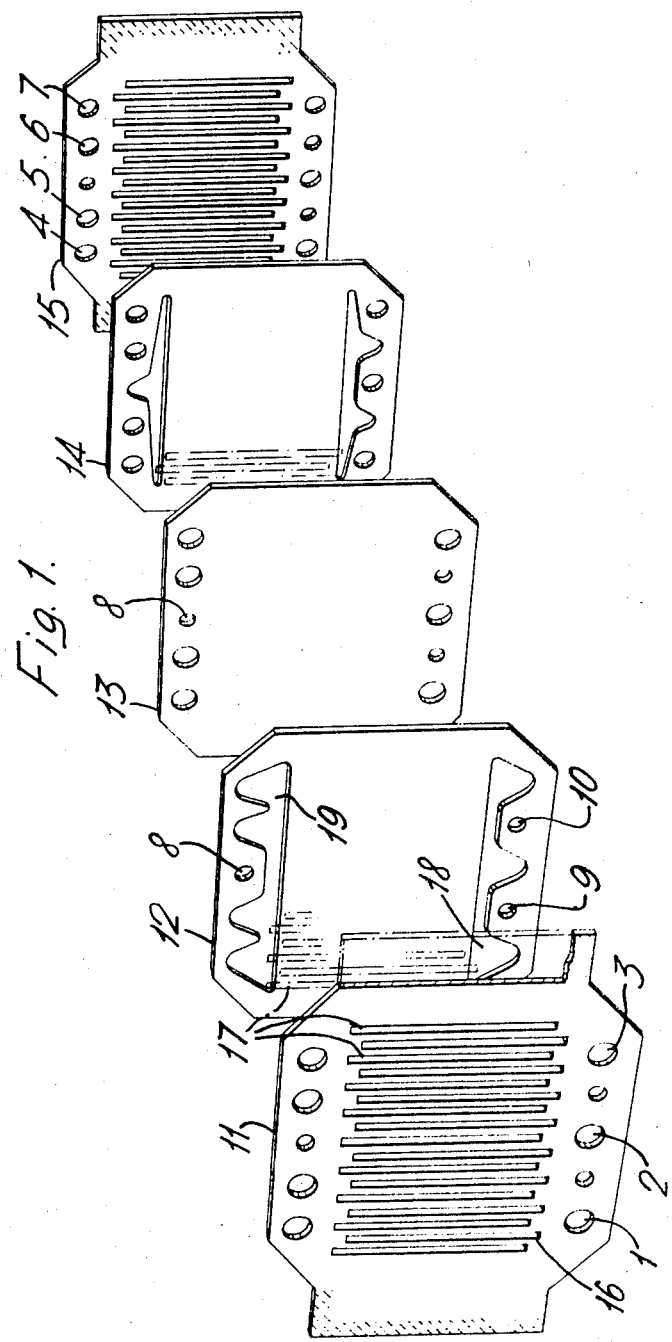

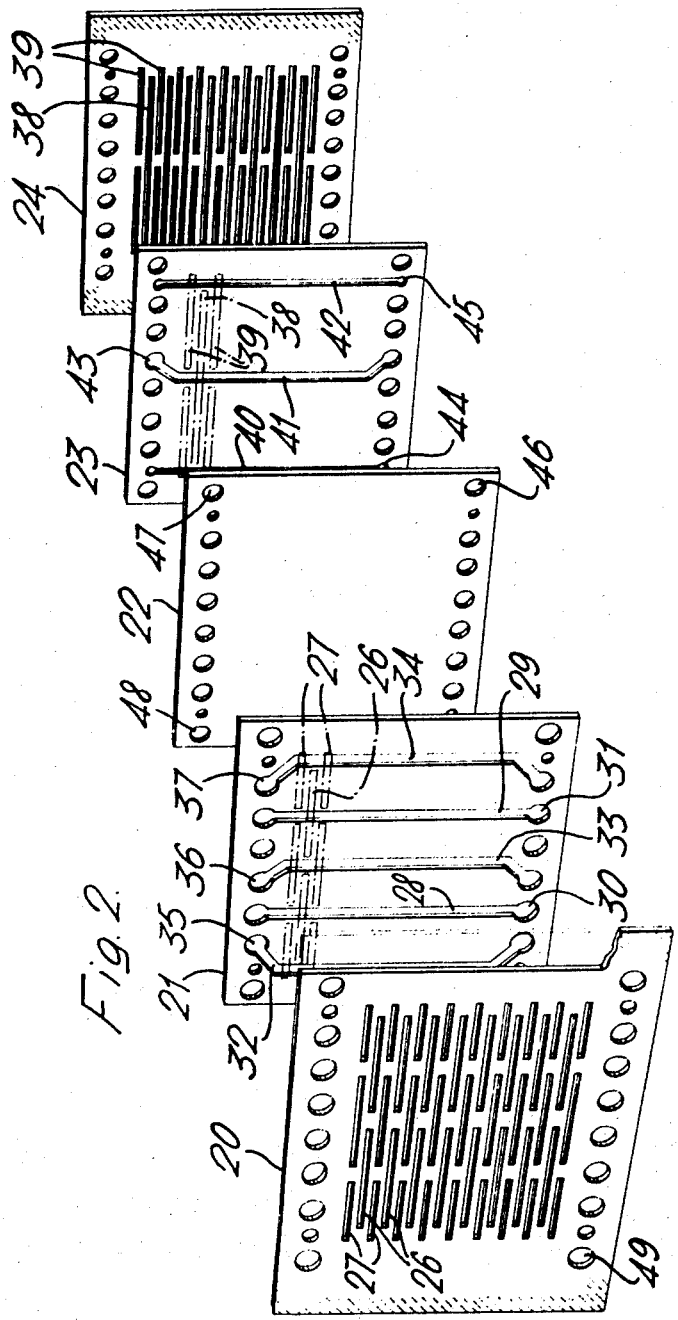

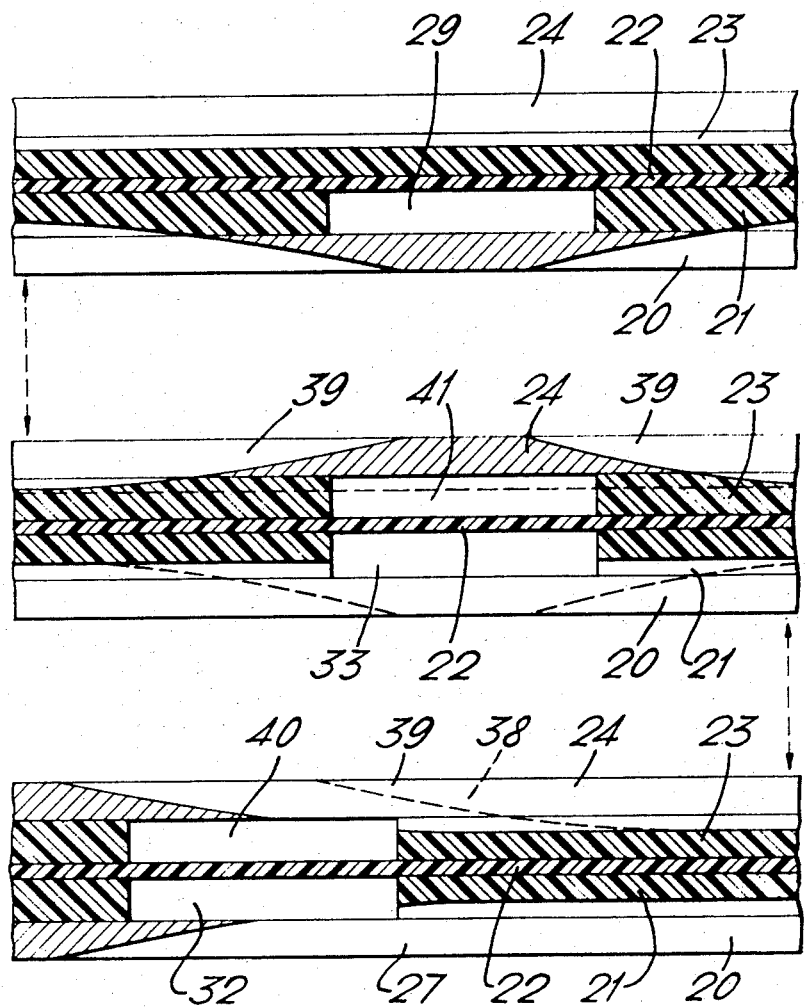

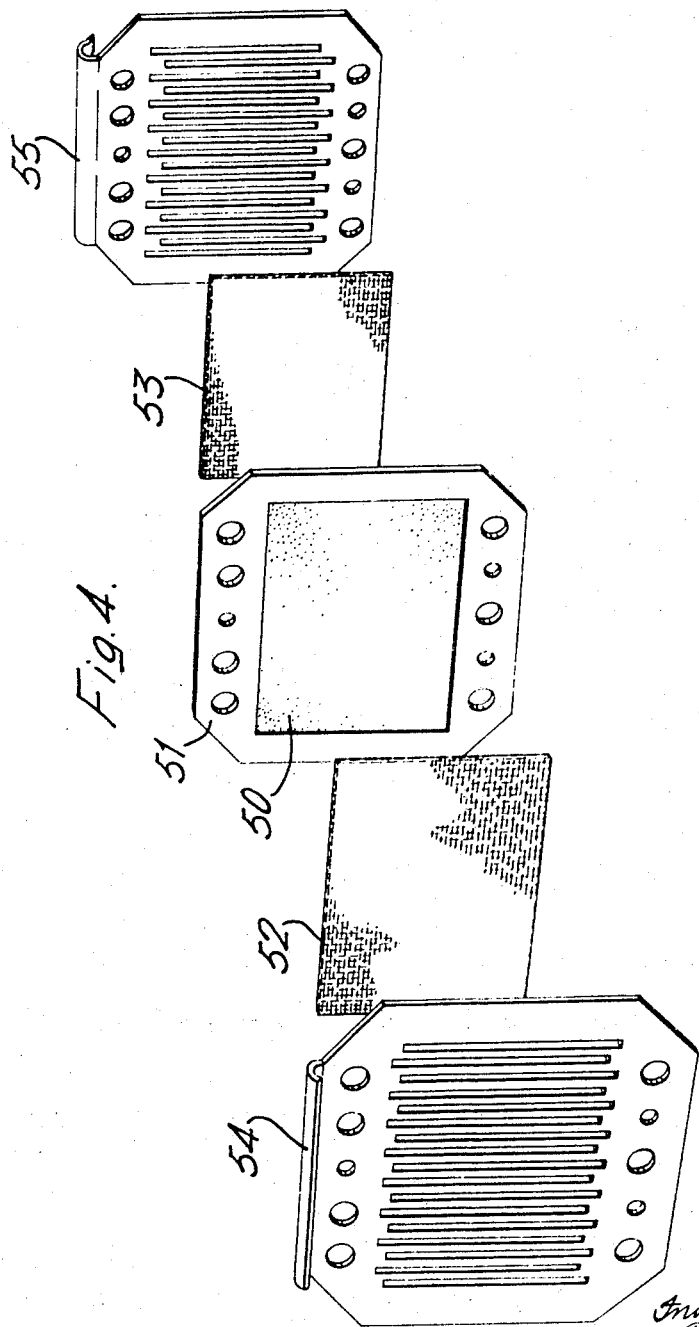

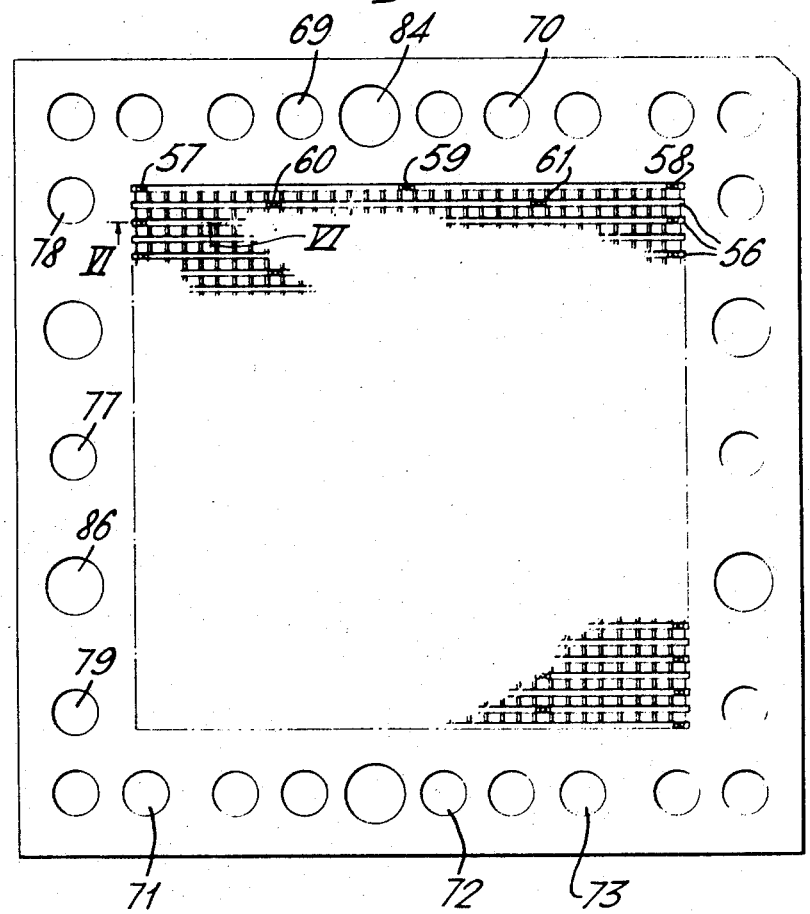

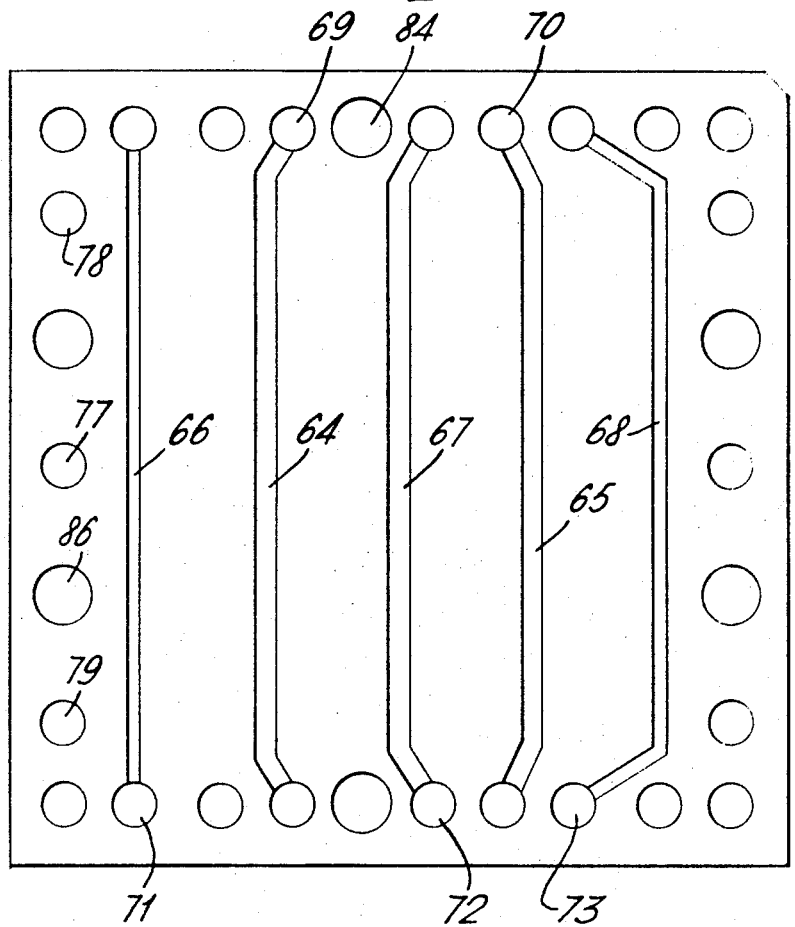

United States Patent Office 3,468,712
Patented Sept. 23, 1969

3,468,712
ELECTRO-CHEMICAL CELL ARRANGEMENTS
Peter James Gillespie, Walton-on-Thames, Surrey, England, assignor to Energy Conversion Limited, London, England, a British company
Filed May 16, 1966, Ser. No. 550,420
Claims priority, application Great Britain, May 18, 1965, 20,972/65
Int. Cl. H01m 27/12
U.S. Cl. 136—86        10 Claims This invention relates to electro-chemical cell arrangements.

Where a plurality of cells is arranged to be built up to form a battery in which the cells are connected electrically in series, or in parallel or in series-parallel, to enable the arrangement to cope with a greater quantity of gases or to provide a higher output voltage or greater power at the same voltage, it has been usual, in order to feed the reactant gases into the cells, to provide considerable gas space behind each electrode so that the gases may be adequately distributed over the surfaces of the electrodes. These gas spaces are fed by input passages leading to parts of said spaces and output passages leading from other parts thereof.

When an electrode is of porous material, it has been proposed to provide gas passages in the form of sets of interleaved comb-like channels formed in a backing member for the electrode, the limbs of the one set of channels being used as input channels and the limbs of the other set as output channels, the gas in effect flowing from one set to the other through local portions of the porous material of the electrode. One such arrangement is described in British Patent No. 959,557. The present invention is based on this known arrangement but the invention is directed to providing an even more satisfactory gas passage arrangement that enables unit cells to be made of small thickness, since it is then possible to fabricate a battery of particularly favourable overall thickness, of low weight and at no great cost.

In accordance with the invention, in a gas distribution arrangement for feeding gas to an electrode of an electro-chemical gaseous cell in which the gas is fed to and from the electrode surface through sets of alternate parallel passages, the said passages are formed in one member (hereinafter referred to as a distributor member) and manifolds for leading gas to the or at least one set of said alternate passages and for leading gas from the or at least one other set of said alternate passages are formed in a separate member (hereinafter referred to as a manifold member).

The passages in said distributor member may be slots therethrough, or they may be grooves in one face thereof with at least one hole from the bottom of each groove passing through to the other side of the member, said holes extending over only a portion of the length of the respective grooves, and holes in like grooves being substantially ordered with respect to each other so as to match up with the appropriate manifold in the manifold member.

Preferably parts of the electrode-engaging side of the distributor member between said passages are uneven lengthwise so as to leave spaces for gas flow over the electrode surface from the gas feed passages to the associated gas exhaust passages.

The manifold member and/or associated distributor member may be adapted for heat exchange and for this purpose one or both of the members may be recessed for the possible reception of means to break up flow of cooling gas through the recess. Alternatively, additional heat exchange members may be provided in association with the distributor member and manifold member combination.

Preferably each member of an assembly comprises matching gas flow holes with connecting passages, where necessary, to respective gas feed and gas exhaust manifolds.

It is convenient to fashion the different members of a gas distribution arrangement in accordance with the invention from plastics material(s) and particularly so if the material can be surface activated by high vapour pressure solvent, because, then, the individual members of a gas distribution arrangement may be bonded together in gas-tight union into a single assembly, either as a single electrode distribution unit, or as a bi-pole unit.

Each electrode of each cell will require a gas distributing arrangement and the two arrangements may be of similar form in accordance with the invention, though the gas flow arrangements are less stringent for the hydrogen side, for example in a hydrogen/air cell; they will in any case differ in their manifold arrangements.

It will be evident that the greater the number of sets of alternate slots in any one area representing the electrode surface to be fed with gas, the shorter the said slots may be arranged to be. This is of advantage, since the slots will normally be of very small dimensions and manifold feeding to one end of a gas passage formed by such a slot tends to result in an appreciable pressure drop along the passage if it is of any great length.

The member having the sets of alternate slots formed therein will be metallic, or will have a conducting surface, to act as a current carrier for the particular electrode, and it will be convenient to extend these members, if metallic, so as to present free surfaces for cooling purposes, the extended parts forming cooling fins. In a preferred arrangement, the said cooling fins are formed by extending the said members in the direction lengthwise of the said sets of slots so that heat flow from the parts of the member between the slots is direct to the cooling fin.

It is an advantage of a structure in accordance with the invention that removal of the gas feed manifolds from the face of the separator greatly reduces the risk of gas leakage past the gasket which surrounds each cell and which makes the gas seal between adjacent separators.

In order that the invention may be more clearly understood, two forms of gas distribution arrangements for fuel cells forming part of a battery will now be described by way of examples with reference to the accompanying drawings.

In both forms, the construction is suitable for use as a separator between cells arranged in series; that is, provision is made to feed, say, hydrogen, or hydrogen-containing gas, to one side and oxygen, or air, to the other side, of each separator.

FIG. 1 is an exploded view of a form of gas distribution arrangement in accordance with the invention in which sets of passages feeding gas to and from the electrode are aligned in the direction parallel with the edges forming the cooling fins.

FIG. 2 is a similar exploded view of another form of separator in which the passages are at right angles to the cooling fin edges.

FIG. 3 is an enlarged view of the assembly shown in FIG. 2.

FIG. 4 is an exploded view of a typical unit of a fuel cell battery incorporating separators of the form shown in FIG. 1.

FIG. 5 is a plan view of an air distribution member.

FIG. 6 is a fragmentary enlarged sectional view along the line VI—VI of FIG. 5.

FIG. 7 is a plan view of a manifold member of the gas distribution assembly.

Figure 8:
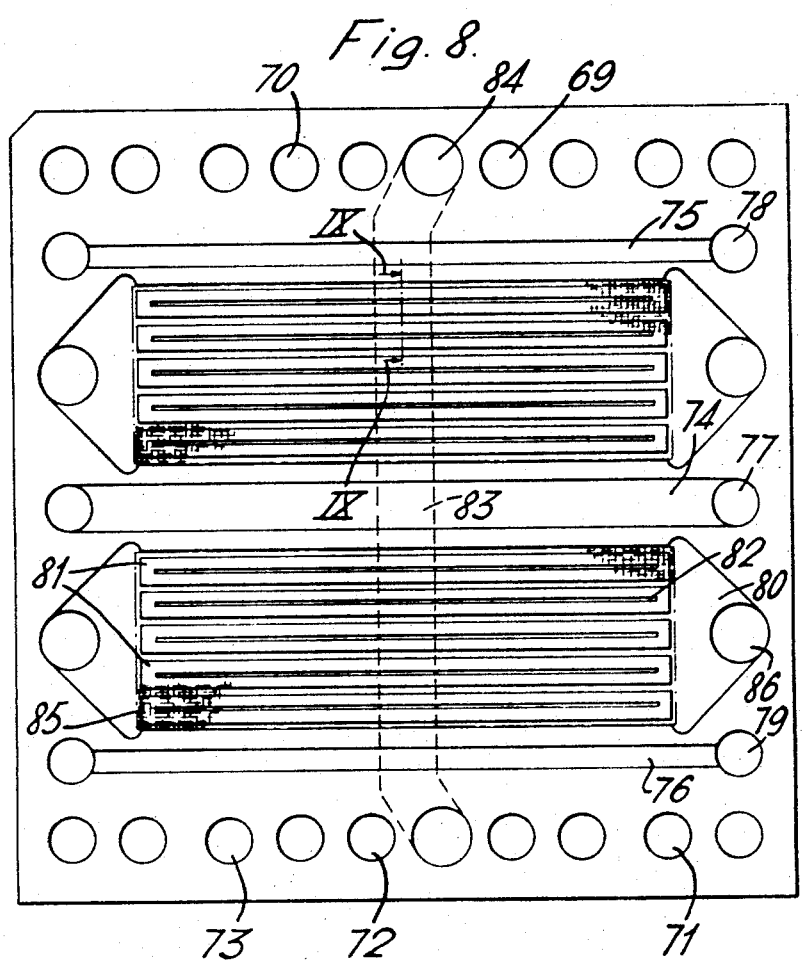
FIG. 8 is a plan view of the member which backs the hydrogen member.

Referring to FIGURE 1, the five members of the separator unit are each provided with matching air inlet ports 1, 2 and 3 and air outlet ports 4, 5, 6 and 7 and with a hydrogen inlet port 8 and hydrogen outlet ports 9 and 10. It will be seen that the hydrogen ports are of smaller diameter and fewer in number than the air ports, this being possible because of the relatively smaller quantity of hydrogen flow than of air. The end members 11 and 15 of the unit are of a metal which is resistant to electrolyte attack, say nickel or titanium foil, while the two manifold members 12 and 14 and the actual separator 13 are of plastic material, such as polyvinylchloride.

The member 11 is intended to be presented to the air electrode of a cell and the distributor inlet slots are indicated at 16 and the exhaust slots at 17; it will be seen from the representative ghosted-in portion of slots superimposed on the manifold member 12, that the inlet slots overlap the manifold hole 18 in the latter member, the exhaust slots similarly overlapping the outlet manifold hole 19. The manifold holes are shaped to embrace the respective air inlet ports 1, 2 and 3 and the air outlet ports 4, 5, 6 and 7 respectively. Similar arrangements are made on the hydrogen side, as will be observed from the drawing.

The shaded portions of members 11 and 15 may function as cooling fins, but it is seen that, in order to allow for the heat flow along the portions between the gas slots (16 and 17 on the air electrode side) rather more metal is required to be left between the ends of the gas slots and the gas ports if the heat is to be conducted to the cooling fins.

In practice, the five members are bonded together in gas-tight fashion; they may, however, be arranged to be compressed together when a whole series of cells and separator assemblies are clamped together in a solid unit in any of several ways that will be known to those skilled in the art.

Air and hydrogen supplies will then be connected respectively to end members with inset lead holes lining up with the ports 1, 2, 3 and 8 respectively, while exhaust connections will be made to lead holes lining up with the ports 4 to 7, 9 and 10 respectively.

In the arrangement illustrated in FIGURE 2, it is seen that the direction of the parallel gas slots in the end members is at right angles to the direction of the slots in FIGURE 1. By this means, not only is it possible to provide more efficient gas distribution by shortening the maximum length of feed path along the passages from the manifolds, but the heat conduction along the metal between these passages is in the right direction to flow directly to the cooling fins, which latter are also shown shaded as in FIGURE 1.

In member 20 which is to be associated with an air electrode, rows of discontinuous slots 26 are provided to form passages for leading air to the electrode surface and interleaved rows of similar slots 27 are provided to exhaust from the surface. Inlet manifold holes 28 and 29 are connected to air inlet ports 30 and 31, common to all members, and exhaust manifold holes 32, 33, 34 are connected respectively with common air exhaust ports 35, 36, 37.

The rows of inlet slots 26 each comprise two parts which cross the manifold holes 28 and 29 respectively; the slots being open to these manifold holes, air flows from each manifold hole into each part of its associated slot. The two parts of the rows 26 do not, however, make connection with the manifold holes 32, 33 or 34.

For mass production, the slots would probably be made by a punching operation but, where only a few separators are required FIGURE 3 illustrates a method of using a large diameter milling wheel (not shown) to make the slots; it will be observed that on the inlet side the wheel is made to enter the member at such points that the cut it makes only breaks through the member itself near the exhaust manifold holes but at the same time leaves sufficient land to avoid "breaking into" the actual exhaust manifold holes. In fact, it is possible, as shown in FIGURE 3, to machine the slots after the five members 20–24 have been compacted together; in this way, a certain amount of the manifold members 21 and 23 will also be machined away, but this should be advantageous.

The rows of exhaust slots 27 comprise two end, shorter, slots and a middle, longer, slot. The end slots "break into" the exhaust manifold holes 32 and 34 respectively and the middle slot is open to manifold hole 33, but manifold land remains between these slots and the inlet manifold holes. These exhaust slots may be milled in a similar way to the slots 26 and a method of formation is also illustrated in FIGURE 3.

At the hydrogen side, the distribution arrangement is simpler because of the relatively smaller quantities involved. The rows of inlet slots 38 are continuous symmetrically about the inlet manifold hole 41 to which they are open; but these slots 38 do not "break into" the exhaust manifold holes 40 or 42. The rows of exhaust slots 39, however, are arranged in two parts "breaking into" exhaust manifold holes 40 and 42 respectively but not into manifold hole 41. A method of achieving satisfactory formation of these slots by machining is also illustrated in FIGURE 3, though here again, for mass production the slots would probably be punched in the metal.

Assembly of the members of the separators with the cell units into a battery of cells is assisted by the provision of a multiplicity of holes, such as 46, 47, 48 and 49, for through-bolts by which the members and cells may be adequately compressed together using stout end plates as in known manner.

It may assist assembly if the five-member separators are pre-combined into a unit and it is advantageous to form the outer members from the same sheet of foil and to fold the sheet over, and the foil aids current flow through the battery so that the other three members may be embraced between the fold.

FIGURE 4 illustrates the assembly of one cell unit of a battery with appropriate separators of this form. The cell 50 comprises an absorbent matrix, for instance, of asbestos or glass fibres, holding electrolyte and having porous electrodes applied to the opposite faces thereof, and the cell is mounted in a frame 51, fine mesh metal screens 52, 53, or graphite cloth members, as shown, and separators 54 and 55, which are only depicted in part, being brought into position; the hydrogen side of the one separator is applied to the negative electrode side of the cell and the air side of the other separator is applied to the positive electrode side of the cell. Other cells and screens are placed on either side, together with further separators, until the battery of cells is complete. The separators at each end of the battery will be single-sided and the ends of the battery blanked off.

It will be understood that the disposition, number and size of the slots shown in the drawings is only by way of illustration and that this may be varied at will, as may be found desirable to suit particular requirements of feed of the particular gas.

In the further form of distribution arrangement indicated in FIGURES 5–10, the air distribution member is as shown in FIGURE 5, FIGURE 6 being a part section on the line VI–VI in FIGURE 5. The member is a square plate in which a number of slots 56 are cut parallel to each other to cover an area equal to the area of the electrode it is required to feed. These slots are provided with passages 57, 58 passing through the remaining thickness of the member; the passages are shown in FIGURES 5 and 6 as drilled holes but in practice they may be of simple rectangular shape.

These passages are arranged in different patterns in alternate slots and in one set of slots the pattern is of two outer (57, 58) and one central (59); in the other set, there are two (60, 61) each situated at about a quarter of the distance in from the ends of the slots. The passages 57, 58 are slightly smaller than the central passage 59 for reasons of symmetry of flow and the combined cross-sectional area of the passages 57, 58 and 59 approximates to that of the passages 60 and 61.

As shown in FIGURE 6, the land between adjacent slots 56 is uneven along its length by virtue of channels 62 formed therein; these channels leave ridges 63 spread along the length. Since it is intended that the oxidant electrode of a cell should be engaged by this face of the distribution member, it is seen that the electrode will be spaced from the edges of the slots and that air fed into the slots through the holes 60, 61 in the supply slots will flow freely through the channels 62 over the surface of the electrode into the adjacent exhaust slots. In order to lead air to the supply passages 60, 61 and from the exhaust passages 57, 58 and 59, the distribution member is backed by a manifold member as shown in FIGURE 7. The manifold member has feed grooves 64, 65 to match up with the passages 60, 61 and exhaust grooves 66, 67, 68 to match up with passages 57, 58, 59. Thus air supplied through holes 69, 70 at each end of the grooves 60, 61 will be fed to the electrode through the appropriate grooves, passages and slots and the exhaust gases from the electrode will pass from the member through holes 71, 72, 73 at the end of the grooves 66, 67, 68.

The distribution member for the hydrogen electrode is similar to the air distribution member shown in FIGURE 5 but, as the stoichiometric throughput of hydrogen is less than that of air, a smaller area of flow passage is required connecting the bottom of each distribution slot and the back of a member. Thus flow passages in the slots of the hydrogen distribution member will be arranged to align with input grooves 74 of the member shown in FIGURE 8 which is to back the hydrogen member. Two sets of flow passages, the combined area of which approximates to the area of the input passage in the exhaust slots, align with exhaust grooves 75, 76 respectively in the backing member. Feed holes 77 are provided at the ends of input grooves 74 and holes 78, 79 at the ends of the exhaust grooves 75, 76.

Figure 9:
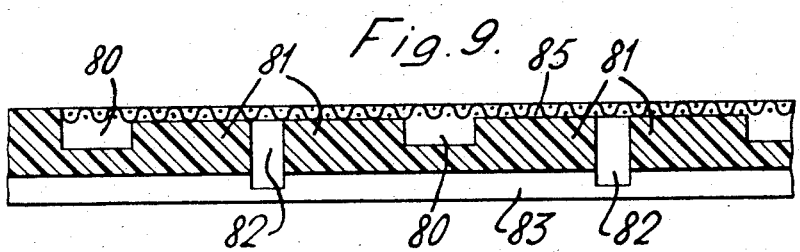
FIG. 9 is a fragmentary, enlarged sectional view taken on the line IX—IX of FIG. 8.

The backing member for the hydrogen member also incorporates a heat exchange arrangement in the form of two units between the input groove 77 and the two exhaust grooves 78, 79. The two arrangements are identical and only one need be described. It comprises a recess 80 of rectangular shape with the triangular-shaped ends. In the rectangular part, five portions 81 of the member remain upstanding from the bottom of the recess, but the height of the portions 81 is less than the depth of the recess 80; this is illustrated in FIGURE 9, which is a sectional view on the line IX in FIGURE 8. In each of the portions 81, a slot 82 is formed, the depth of the slots 82 being greater than the depth of the recess 80 and a groove 83 in the back of the member breaking through into each of the slots 82. Thus cool air fed into grooves 83 through supply holes 84 at the ends of the groove, will pass into each of the slots 82. A wire mesh 85, for instance of copper wire, is situated between the tops of the portions 81 and the back of the hydrogen distribution member so that air flowing through the slots 82 will be broken up into a turbulent flow over the mesh and over part of the hydrogen distribution member and will cool that part of the member; the cooling air then passes into the different parts of the recess 80 whence it flows out through one or other of the exhaust holes 86 at the ends of the recess. Groove 83 does not, of course, break into the grooves 77, 78, 79 on the front of the member, the depth of the groove 83 being appropriately changed at the points where it crosses these three other grooves. The groove 83 is closed by the back of the air manifold member assembled next to it.

Figure 10:
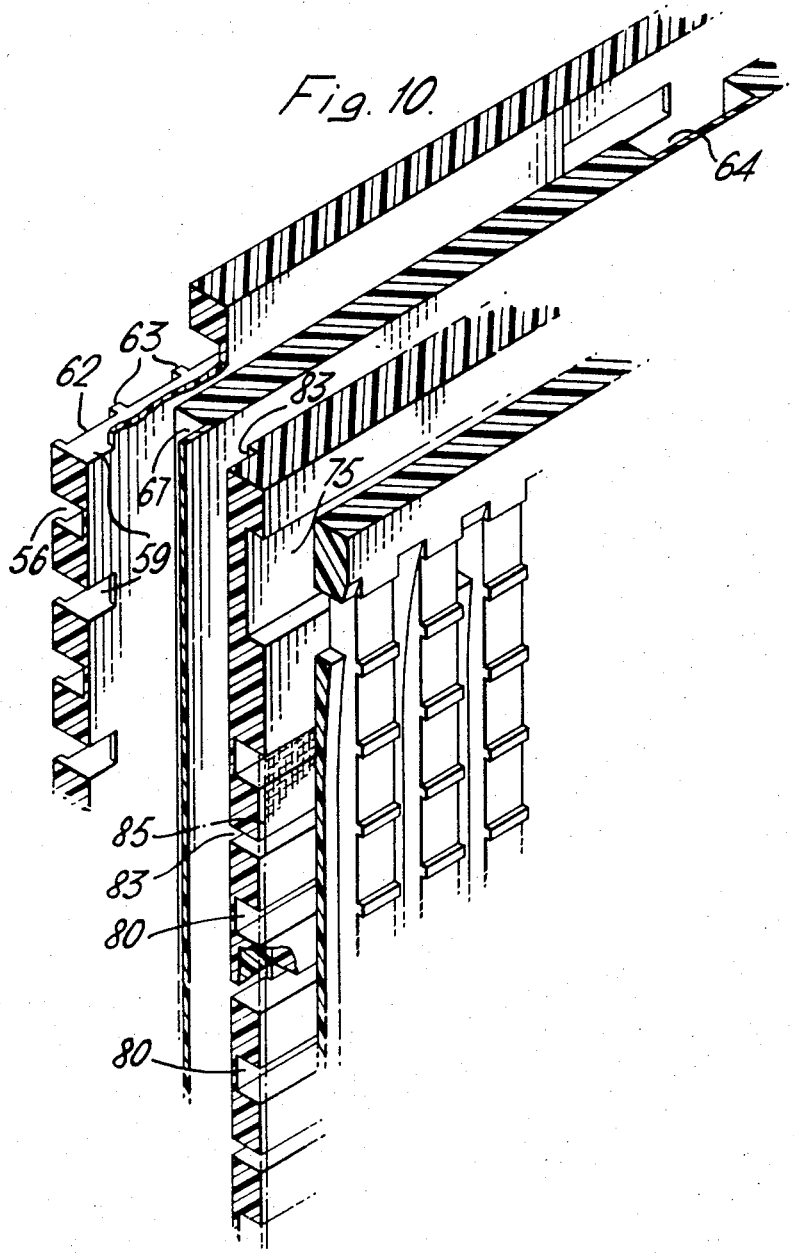
FIG. 10 is an enlarged, fragmentary perspective view of four parts of the assembly.

FIGURE 10 is a fragmentary view of parts of the assembly of the four members constituting a gas distribution unit for feeding electrodes of opposite polarities of adjacent cells in a fuel cell battery. It will be noted that the slots 56 in the air distribution member and in the hydrogen distribution member are at right-angles to each other, thus enabling full use to be made of the edges of the members for the feed holes to the different grooves and recesses.

Each of the four members is formed from a plastics material, preferably acrylonitrile-butadiene-styrene terpolymer, and they may, of course, be moulded to the shape required. Members of this particular material may be bonded together by surface activation by solvent prior to being compacted together and the unit assembly becomes a rigid pack. The outer members which contact the electrodes may be plated, such as with gold, so that they may act as current collectors for the respective electrodes. Moreover, by arranging for both end members to be moulded in a single piece with relieved spacing parts between them, this moulding may be bent on itself so that the two members then embrace the inner two members. The relieved parts may, in fact, be separate but connected to each of the members by a metallic insert which may act as a hinge and/or as interconnector between the electrodes.

Such a gas-distributor/current-collector pack is suitable for low temperature fuel cells and, if gold-plating is used, it may serve for acid electrolyte fuel cells.

Other forms of distributor pack within the scope of the invention will be evident to those skilled in the art.

I claim:

1. A gas distribution system for an electrode of an electrochemical gaseous cell in which gas is fed to and from the electrode surface through sets of alternate parallel passages, comprising a distributor member and a manifold member, said distributor member comprising a first plate member having formed therein a first set of gas passages to feed gas to an electrode surface of the cell and a separate second set of passages to exhaust gas from said electrode surface, said manifold member comprising a second plate member separate from said first plate member, said second plate member having at least one gas inlet manifold and at least one gas outlet manifold formed therein, said gas inlet manifold being of configuration as to overlay portions only of gas passages of said first set for gas flow between said inlet manifold and said first set gas passages and said gas outlet manifold being of configuration as to overlay portions only of gas passages of said second set for gas flow between said outlet manifold and said second set of gas passages.

2. A gas distribution system as claimed in claim 1 wherein said distributor member is extended at a side creating a heat exchange fin.

3. A gas distribution system as claimed in claim 1 wherein said first and second set of gas passages are slots through said first plate member.

4. A gas distribution system as claimed in claim 1 wherein the passages in said distributor member are grooves in one face thereof, with at least one hole from the bottom of each groove passing through to the other side of the member, said holes extending over only a portion of the length of the respective grooves, and holes in like grooves being substantially ordered with respect to each other so as to match up with the appropriate manifold in the manifold member.

5. A gas distribution system as claimed in claim 1 wherein said second plate member has a plurality of said gas outlet manifolds and a plurality of said gas inlet manifolds.

6. A gas distribution system as claimed in claim 1 comprising distributor members and manifold members for two electrodes of opposite polarity, all said members being combined into a single multi-member unit.

7. A gas distribution system as claimed in claim 1 wherein said distributor member is metallic and acts as a current collector for an electrode of said cell.

8. A gas distribution system as claimed in claim 1 wherein said distributor member has a conducting surface which acts as a current collector for an electrode of said cell.

9. A gas distribution system as claimed in claim 1 wherein said first set of gas passages is a plurality of spaced parallel fluid channels and said second set of gas passages is a plurality of spaced parallel fluid channels that alternate with the fluid channels of said first set.

10. A gas distribution system as claimed in claim 9 wherein said gas inlet manifold and said gas outlet manifold each has a longitudinal axis which extends perpendicularly to the longitudinal axes of said parallel fluid channels.

References Cited
UNITED STATES PATENTS

| | | | |
|---|---|---|---|
| 3,101,285 | 8/1963 | Tantram et al. | 136—86 X |
| 3,372,060 | 3/1968 | Platner | 136—86 |
| 3,134,696 | 5/1964 | Douglas et al. | 136—89 |
| 3,278,336 | 10/1966 | Uline et al. | 136—86 |

ALLEN B. CURTIS, Primary Examiner